US008163181B2

(12) United States Patent
Peeters et al.

(10) Patent No.: US 8,163,181 B2
(45) Date of Patent: Apr. 24, 2012

(54) APPARATUS AND METHOD FOR TREATING FGD BLOWDOWN OR SIMILAR LIQUIDS

(75) Inventors: Jeffrey Gerard Peeters, Toronto (CA); William A. Bonkoski, Conshohocken, PA (US); Pierre Lucien Cote, Dundas (CA); Hidayat Husain, Oakville (CA); Timothy Michael Pickett, Salt Lake City, UT (US)

(73) Assignee: Zenon Technology Partnership, Wilmington, DE (US)

( * ) Notice: Subject to any disclaimer, the term of this patent is extended or adjusted under 35 U.S.C. 154(b) by 0 days.

(21) Appl. No.: 12/856,030

(22) Filed: Aug. 13, 2010

(65) Prior Publication Data

US 2010/0300963 A1 Dec. 2, 2010

Related U.S. Application Data

(62) Division of application No. 11/996,384, filed as application No. PCT/CA2006/001220 on Jul. 24, 2006, now Pat. No. 7,790,034.

(60) Provisional application No. 60/701,996, filed on Jul. 25, 2005, provisional application No. 60/736,859, filed on Nov. 16, 2005.

(30) Foreign Application Priority Data

Aug. 26, 2005 (CA) .................................. 2517322

(51) Int. Cl.
*C02F 3/04* (2006.01)
(52) U.S. Cl. ........................................ 210/615; 210/150
(58) Field of Classification Search .................. 210/601, 210/614, 615, 616, 617, 618, 150, 151
See application file for complete search history.

(56) References Cited

U.S. PATENT DOCUMENTS 3,617,540 A 11/1971 Bishop et al.
(Continued)

FOREIGN PATENT DOCUMENTS

CA 2477333 2/2006
(Continued)

OTHER PUBLICATIONS

Reinsel et al., "Anoxic Biotreatment Cell (ABC) for Removal of Nitrate and Seleniam from Moving Efficient Waters", pp. 99-104 (1999).

(Continued)

*Primary Examiner* — Fred Prince
(74) *Attorney, Agent, or Firm* — Scott Pundsack; Borden Ladner Gervais LLP

(57) ABSTRACT

A process has steps of one or more of aerobic treatment to remove COD and nitrify a waste stream, anoxic treatment to denitrify a waste stream, anoxic treatment to remove selenium and anaerobic treatment to remove heavy metals and sulphur. The process may be used to treat, for example, FGD blow down water. The process may further include one or more of (a) membrane separation of the waste stream upstream of the anoxic digestion to remove selenium, (b) dilution upstream of the biological treatment step, (c) physical/chemical pretreatment upstream of the biological processes or dilution step to remove TSS and soften the waste stream, or (d) ammonia stripping upstream of the biological treatment steps or dilutions step. These processes may be provided in a variety of suspended growth or fixed film reactors, for example a membrane bioreactor or a fixed film reactor having a GAC bed. Processes for biological treatment of inorganic compounds in a fixed medium reactor is described including steps of one or more of maintaining desired ORP levels, optionally by controlling nutrient addition, and removing solids or gas bubbles from the medium bed.

4 Claims, 9 Drawing Sheets

U.S. PATENT DOCUMENTS

| | | | |
|---|---|---|---|
| 3,957,632 A | | 5/1976 | Knopp et al. |
| 4,043,936 A | * | 8/1977 | Francis et al. ............... 210/605 |
| 4,225,430 A | * | 9/1980 | Bosman ...................... 210/610 |
| 4,490,258 A | | 12/1984 | Heijnen et al. |
| 4,664,804 A | | 5/1987 | Morper et al. |
| 4,725,357 A | | 2/1988 | Downing et al. |
| 4,839,052 A | | 6/1989 | Maree |
| 5,185,080 A | | 2/1993 | Boyle |
| 5,192,441 A | | 3/1993 | Sibony et al. |
| 5,228,997 A | | 7/1993 | Martin et al. |
| 5,271,831 A | | 12/1993 | Oremland |
| 5,482,630 A | * | 1/1996 | Lee et al. ..................... 210/605 |
| 5,556,536 A | | 9/1996 | Turk |
| 5,651,892 A | | 7/1997 | Pollock |
| 5,653,883 A | | 8/1997 | Newman et al. |
| 5,660,730 A | | 8/1997 | Lucchese et al. |
| 5,733,456 A | | 3/1998 | Okey et al. |
| 5,830,357 A | * | 11/1998 | Vredenbregt et al. ........ 210/611 |
| 5,895,576 A | | 4/1999 | Yamasaki et al. |
| 5,976,376 A | | 11/1999 | Ogushi et al. |
| 6,139,743 A | * | 10/2000 | Park et al. ..................... 210/605 |
| 6,183,644 B1 | | 2/2001 | Adams et al. |
| 6,207,047 B1 | | 3/2001 | Gothreaux |
| 6,444,126 B1 | | 9/2002 | Gates et al. |
| 6,692,642 B2 | | 2/2004 | Josse et al. |
| 6,811,702 B2 | | 11/2004 | Verstraete et al. |
| 6,894,203 B2 | | 5/2005 | Murasawa et al. |
| 6,896,805 B2 | | 5/2005 | Austin |
| 6,998,048 B1 | | 2/2006 | Dobie et al. |
| 7,022,233 B2 | * | 4/2006 | Chen ........................... 210/605 |
| 7,025,885 B2 | | 4/2006 | Cote et al. |
| 2004/0060862 A1 | * | 4/2004 | Savage et al. ................ 210/618 |
| 2005/0023202 A1 | | 2/2005 | Horng et al. |
| 2005/0133443 A1 | | 6/2005 | Applegate et al. |
| 2006/0272198 A1 | | 12/2006 | Yoon et al. |

FOREIGN PATENT DOCUMENTS

| | | |
|---|---|---|
| CA | 2517322 | 1/2007 |
| CA | 2615045 | 2/2007 |
| EP | 0692458 A1 | 1/1996 |
| EP | 0769479 A1 | 4/1997 |
| EP | 0773192 A1 | 5/1997 |
| EP | 1270513 A1 | 1/2003 |
| JP | 8323391 | 12/1996 |
| JP | 105789 | 1/1998 |
| JP | 200162486 | 3/2001 |
| WO | 8700161 A1 | 1/1987 |
| WO | 2004071973 A1 | 8/2004 |
| WO | 2005016826 A2 | 2/2005 |
| WO | 2007012181 A1 | 2/2007 |

OTHER PUBLICATIONS

Twiowell et al., "Technologies and Potential Technologies for Removing Selenium from Process and Mine Wastewater", Undated, Butte, Montana, U.S.A.

Scheurman, "Selenium Reduction Issues in a Coal Fired Power Plant", Industrial Water Conference, Orlando, Florida, Oct. 2005.

Oremland, "Seienate Reduction to Elemental Selenium by Anaerobic Bacterial in Sediments and Culture: Biogenchemical Significance of a Novel, Sulfate-Independent Respiration", Applied and Environmental Microbiology, Sep. 1989, vol. 55, No. 9, pp. 2333-2343.

Stolz et al., "Microbial transformation of elements: the case of arsenic and selenium" Int. Microbial (2002), 5, pp. 201-207.

Oremland et al., "In Sity Bacterial Selenate Reduction in the Agricultural Drainage Systems of Western Nevada", Applied and Environmental Microbiology, Feb. 1991, vol. 57, No. 2, pp. 615-617.

Haztech News, "Biological Process Proved Most Consistent in Demonstration for Removing Se from Water". The Newsletter of Hazardous Waste Treatment Technology, vol. 16, 2001.

Wahlquist et al., "Effective Biological Water Treatment Through Biological Process Control", Tailings and Mine Waste Conference, Vail Co., 2003.

Adams et al., "Microbial and Cell-Free Selenium Bioreduction in Mining Waters", Ch. 24 of Frankenberger et al., Environmental Chemistry of Selenium, Marcel Dekker, Inc., 1998, pp. 479-499.

Lovely, "Dissimilatroy Metal Reduction", Annu. Rev. Microbiol., 1993, 47, pp. 263-290.

Adams et al., "Biotechniques for Metal and Toxic Inorganic Removal from Mining Process and Waste Solutions", Randol Gold Forum, 1996, pp. 143-146.

Adams et al., "Bioreduction of Selenate and Selenite", from A.E. Torma et al., Biohydrometallurgical Technologies, The Minerals, Metals and Materials Society, 1993, pp. 755-771.

Kurita Water Ind Ltd, English Abstract of JP 8323391, Dec. 1996.

Electric Power Dev Co et al., English Abstract of JP 2001062486, Mar. 2001.

Zenon Technology Partnership, European Search Report of EP 1910234, dated Jul. 9, 2008.

Applied Biosciences Corporation, "Biological Treatment of FGD Wastewaters", presented Jan. 27, 2005, Raleigh, N.C., U.S.A.

Sonstegard et al., "ABMet Biological Selenium Removal from FGD Wastewater", Industrial Water Conference, Orlando, Florida, Oct. 2005.

MSE Technology Applications, Inc. et al., "Selenium Treatment/Removal Alternatives Demonstration Project", Mine Waste Technology Program, Activity III, Project 20, Jun. 2001, Bute, MT, U.S.A.

* cited by examiner

APPARATUS AND METHOD FOR TREATING FGD BLOWDOWN OR SIMILAR LIQUIDS

This is a division of U.S. application Ser. No. 11/996,384 filed Jan. 22, 2008, issued as U.S. Pat. No. 7,790,034 on Sep. 7, 2010, which is the U.S. National Phase of International Application PCT/CA2006/001220 filed on Jul. 24, 2006, which claims the benefit of U.S. Application Ser. Nos. 60/701,996 filed Jul. 25, 2005; and 60/736,859 filed Nov. 16, 2005; and, Canadian Patent Application No. 2,517,322 filed Aug. 26, 2005. All applications listed above are incorporated herein, in their entirety, by this reference to them.

FIELD

This invention relates to water treatment including biological water treatment and treatment of feeds containing inorganic contaminants, for example selenium, nitrates or heavy metals, for further example scrubber blow down water from a flue gas desulfurization (FGD) operation in a coal fired power plant.

BACKGROUND

The following background discussion does not imply or admit that any process or apparatus described below is prior art or part of the knowledge of people skilled in the art in any country.

Scrubber blow-down water from a flue gas desulfurization operation in a coal-fired power plant contains a wide range of inorganic contaminants removed from the flue gas. The blow down water may also contain organic contaminants, such as di basic acid (DBA), and ammonia added as part of or to enhance the FGD process. The FGD scrubber blow-down water may have very high total dissolved solids where the main anions are chlorides and the main cations are calcium, magnesium and sodium. The rate of blow-down may be controlled to maintain a desired chloride concentration causing the blow-down water to have a high, but generally stable chloride concentration. The concentration of other contaminants may vary widely as influenced, for example, by burning coal from different sources even in a single power plant. However, the concentration of TDS, TSS, Ca and Mg hardness, nitrate, ammonia, and sulfur for example as sulphate are all likely to be high, and various heavy metals may be present, making the blow down water very difficult to treat, particularly to achieve very low levels of contaminants. Other wastewaters, such as wastewater discharged from mining operations, agricultural drainage or run off water, other industrial waters or even drinking water, may also have unacceptable concentrations of some or all of these inorganic contaminants.

Current methods of treating blow down water rely heavily on physical and chemical processes to remove inorganic contaminants. The physical and chemical processes involve costly chemicals and produce large amounts of sludge. Arsenic, mercury and heavy metals may also be present in the blow down water at above regulated levels. Further, some jurisdictions have recently regulated selenium concentrations in effluents discharged to the environment. The permitted concentration of selenium may be 0.5 ppm or less or 200 ppb or less while the blow down water may contain 1-20 or 2-10 ppm of selenium which is not removed in conventional treatment plants.

In U.S. Pat. No. 6,183,644, entitled Method of Selenium Removal and issued on Feb. 6, 2001 to D. Jack Adams and Timothy M. Pickett, dissolved selenium is removed from contaminated water by treating the water in a reactor containing selected endemic and other selenium reducing organisms. Microbes may be isolated from the specific water or imported from other selenium contaminated water. The microbes are then screened for ability to reduce selenium under the site specific environmental conditions. The selected microbes are optimized for selenium reduction, then established in a high density biofilm within a reactor. The selenium contaminated water is passed through the reactor with optimized nutrient mix added as needed. The elemental selenium is precipitated and removed from the water. Products using this or a similar process may be available under the trade mark ABMet® from Applied Biosciences Corp of Salt Lake City, Utah, U.S.A. The entirety of U.S. Pat. No. 6,183,644 is incorporated herein by this reference to it.

SUMMARY

The following summary is intended to introduce the reader to one or more inventions described herein but not to define any of them. Inventions may reside in any combination of one or more of the apparatus elements or process steps described anywhere in this document.

It is an object of an invention described herein to improve on, or at least provide a useful alternative to, the prior art. It is an object of an invention described herein to provide a wastewater treatment process or apparatus. Other objects of one or more inventions described herein are to provide an apparatus or process for treating FGD blow down water or other wastewaters having selenium or nitrate or both, or a process or apparatus for biologically removing inorganic contaminants, for example nitrogen, selenium, arsenic, mercury or sulphur, from waste water. The wastewater may be a raw wastewater or a wastewater that has been pretreated.

A process is described herein having steps of anoxic treatment to denitrify a waste stream, anoxic treatment to remove selenium and anaerobic treatment to remove heavy metals or sulphur or both. Removal of heavy metals is possible because $SO_4$ is present and converted to sulfide by anaerobic $SO_4$ reducing bacteria. The process may further include one or more of (a) membrane separation of the waste stream upstream of the anoxic digestion to remove selenium, (b) dilution upstream of the biological treatment step, (c) physical/chemical pretreatment upstream of the biological processes or dilution step to remove TSS and soften the waste stream, for example through the addition of lime or sulfides and the removal of precipitates, (d) ammonia stripping upstream of the biological treatment steps or dilution step or (e) aerobic treatment to remove COD and nitrify the waste stream upstream of the anoxic treatment. Some of the biological treatment steps may be performed in a fixed film reactor, for example a granular activated carbon bed. One or more of the biological treatment steps may also be performed in a suspended growth reactor such as a membrane bioreactor. Each biological treatment step may be performed in a distinct reactor optimized to perform a step or two or more of the biological treatment steps may be performed in a multiple purpose reactor.

An apparatus is described herein having one or more reactors configured to provide nitrification, denitrification, selenium and heavy metals removal and sulphur removal by biological treatment. The apparatus may further have a reactor to provide aerobic treatment of COD. The reactors may include a membrane bioreactor or a fixed film reactor. The fixed film reactor may comprise a bed of activated carbon or other support materials. The apparatus may further have one or more of an inlet for diluting the feed water to the biological processes, a system for adding lime or sulfides to the wastewater upstream of the biological reactors, one or more physical or chemical pretreatment systems, a precipitate remover, or an ammonia stripper.

An apparatus or process are also described herein for removing nitrates in a fixed film bioreactor. An apparatus or process are also described herein for providing a fixed film bioreactor having two or more zones. The zones may be adapted to remove different contaminants and may have differing oxygen reduction potential (ORP). An apparatus or process are also described herein for using nutrient location or feed rate to control ORP in a fixed film or media bioreactor. An apparatus or process are also described herein for bumping a fixed film or media bioreactor to release solids or gas bubbles from a media bed.

A process or apparatus described herein may be used for treating FGD blow down water or pretreated FGD blow down water to produce an effluent with low concentrations of selenium, for example 1 ppm or less or 10 ppb or less, and low concentrations of total nitrogen, for example 1 mg/L or less or 10 ppm or less, in the effluent. However, an apparatus or process described herein may also have applications in treating blow down water when selenium concentration in the effluent is not a concern. An apparatus or process described herein may also be useful for treating other wastewaters having selenium or nitrate, for example mining, or agricultural runoffs or waste streams, contaminated ground or surface water streams, or petroleum refinery waste streams, particularly where the waste stream also has significant concentrations of one or more of COD, nitrate, ammonia, TDS, TSS, hardness, $CaSO_4$, or sulphate.

BRIEF DESCRIPTION OF THE DRAWINGS

Examples of embodiments of one or more inventions will be described below with reference to the Figures described below.

DETAILED DESCRIPTION

Figure 1:
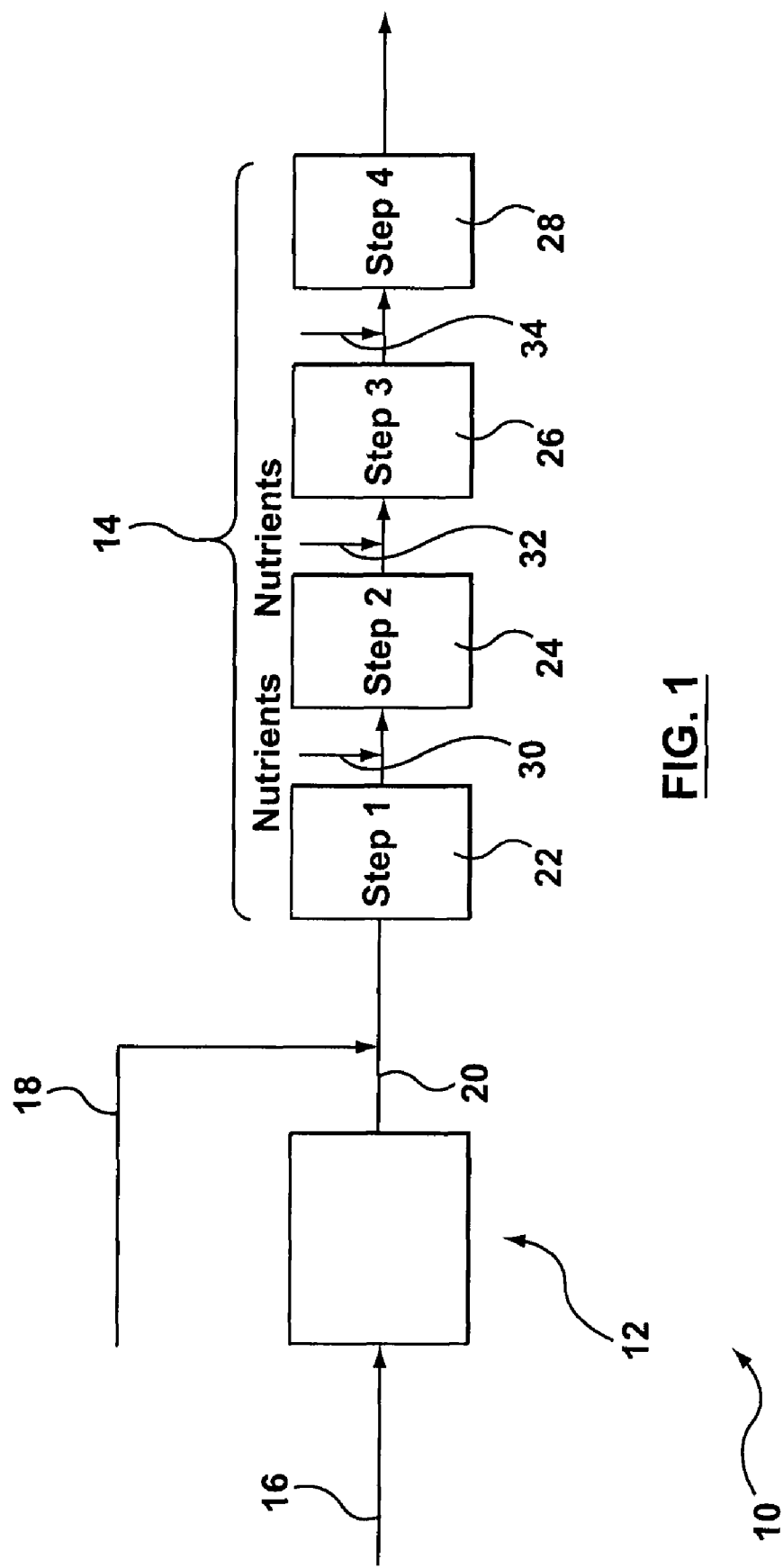
FIG. 1 is a schematic process flow diagram of an apparatus and process for treating water.

Various apparatuses or processes will be described below to provide an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. The applicants, inventors and owners reserve all rights in any invention disclosed in an apparatus or process described below that is not claimed in this document and do not abandon, disclaim or dedicate to the public any such invention by its disclosure in this document.

Table 1 shows the contaminants, and their concentrations, assumed for FGD scrubber blow-down water in the design of an example of an apparatus and process described further below. FGD blow-down water may exist with other contaminants or other concentrations of contaminants. The composition of FGD blow-down can also vary widely over time for a specified coal-fired power plant as influenced, for example, by changes in the source of coal. However, FGD blow-down water is generally characterized by very high total dissolved solids (TDS) where the main anion is chloride and the main cations are calcium, magnesium and sodium. The blow-down water also contains significant concentrations of fine suspended solids, including $CaSO_4$ fines. The blow-down also contains a wide range of inorganic contaminants, including ammonia, which is added for selective catalytic reduction in the scrubbing process. The blow-down water may also contain some organics, particularly DBA (dibasic acid) which may have been added to enhance scrubber efficiency. In the apparatus and process described below, the effluent is intended to have a total nitrogen (TN) content of 10 ppm or less and selenium concentrations of 0.4 ppm or less.

TABLE 1

| Typical FGD Blowdown Water | | |
|---|---|---|
| Parameter | Typical Value | Min-Max |
| Chlorides | 30,000 ppm | 20-40,000 ppm |
| pH | >5.0 < 6.0 | |
| TDS | 75,000 mg/L | 50,000-150,000 mg/L |
| TSS | 2% dry wt | 1-5% dry wt |
| Aluminum—Total | 960 ppm | 80-3700 ppm |
| Antimony | 12 ppm | 0.03-49.0 ppm |
| Ammonia—N | 31 ppm | 0.25-64 ppm |
| Nitrate—N | 350 ppm | 200-450 ppm |
| Total Nitrogen | 200 ppm | 50-400 ppm |
| Arsenic—Total | 15 ppm | 0.27-100 ppm |
| Barium—Total | 100 ppm | 2.0-770 ppm |
| Beryllium | 2.1 ppm | 0.06-6.9 ppm |
| Boron | — | 20-40 ppm |
| Cadmium—Total | 0.8 ppm | 0.12-1.5 ppm |
| Calcium | 18,000 ppm | 10,000-30,000 ppm |
| Chromium—Total | 23 ppm | 0.5-210 ppm |
| Chromium VI | — | 3-12 ppm |
| Cobalt | — | 0.05-4 ppm |
| Copper—Total | 1.7 ppm | 0.3-6.6 ppm |
| $CO_3/HCO_3$ | 1500 ppm | 1-3,000 ppm |
| Fluoride | 360 ppm | 61-1600 ppm |
| Iron—Total | 1400 ppm | 116-6400 ppm |
| Lead—Total | 19 ppm | 0.2-140 ppm |
| Lithium | — | 2-3 ppm |
| Magnesium | 15,000 ppm | 10,000-20,000 ppm |
| Manganese | 10 ppm | 3.6-200 ppm |
| Mercury—Total | 0.38 ppm | 0.5-1.4 ppm |
| Nickel—Total | 10 ppm | 0.5-74 ppm |
| Phosphate—Total | 1.0 ppm | 0-10 ppm |
| Potassium | 6800 ppm | 5000-10,000 ppm |
| Selenium—Total | 17 ppm | 1.5-100 ppm |
| Silver—Total | 10.0 ppm | 0.002-20 ppm |
| Sodium | 15,000 ppm | 10,000-20,000 ppm |
| Sulfate ($SO_4$) | 60,000 ppm | 40,000-80,000 ppm |
| Thallium | 0.76 ppm | 0.02-2.2 ppm |
| Vanadium | — | 1.0-11.0 ppm |
| Total Zinc | 15.0 ppm | 1.7-50.0 ppm |
| Temperature | 130° F. | 125-130° F. |

In greater detail, treating the blow-down raises several challenges which a process or apparatus may address in a variety of ways, as described generally below and then by describing one or more examples of treatment systems and processes. In the following description, pre-treatment refers to treatment occurring upstream of biological process steps.

High TDS concentrations make it difficult to maintain activity for biological treatment. This issue may be addressed by diluting the waste stream upstream of biological treatment. The high TDS also makes it difficult to flocculate and settle biomass in an activated sludge process. This issue is addressed by using fixed film bioreactors or membrane bioreactors which may operate with TDS concentrations at which settlability is low.

In general, high hardness causes scaling due to Ca or Mg oversaturation and any pH or temperature shifts may cause precipitation of calcium or magnesium sulfates or carbonates. FGD and other industrial waste water can contain high levels of sulfate, calcium and magnesium resulting in a danger of scaling conditions, which are exacerbated with increasing alkalinity. When nitrate is removed by biological denitrification, alkalinity is produced which tends to encourage scaling in some processes. These issues may be addressed by a softening pre-treatment, for example lime softening, and optionally by adding acid for pH adjustment upstream of the biological process. Scaling may also or additionally be addressed by performing biological denitrification in a fixed film reactor as described below. pH may decrease in the direction of feed flow through such a reactor, thus making such reactors resistant to scaling. In particular, selenium reducing or other microbes populating the reactor may produce organic acids from the fermentation of the nutrients that are fed to the system, thereby neutralizing alkalinity and inhibiting scaling.

The high TSS, particularly because it is essentially inorganic, causes problems with developing and controlling a suspended biomass and with bioreactor and membrane plugging. This issue may be addressed by pre-treating the waste stream to coagulate or flocculate and then physically remove (for example by settling or floating) suspended solids.

High nitrate concentrations are a concern because nitrate is a preferred electron acceptor for biological reduction over selenate. This issue may be addressed by decreasing the nitrate concentration upstream of a selenate reducing step. The nitrate reducing step may occur in an upstream part of a selenate reducing reactor, as part of a multi-step biological process or multi-part fixed film reactor upstream of a selenate reducing process or part, or as part of a distinct process or reactor.

Ammonia in the blow down water is a concern because concentration in the final effluent may be regulated and because oxidation of ammonia may increase nitrate concentration. This issue is addressed by removing the ammonia, for example, by stripping the ammonia as $NH_3$ in a pre-treatment process or by removing ammonia biologically by a nitrification/denitrification process either in a series process or with recirculating flows. Denitrification, either as a denitrification step in a nitrification/denitrification process or to remove nitrates otherwise created by oxidizing ammonia may be performed in a fixed film bioreactor which may be part of a single or multipart selenium reducing bioreactor.

The presence of various heavy metals, for example Cu, As or Hg, or related oxidized contaminants are a concern because they may be regulated in the effluent but are difficult to remove in low concentrations. This issue may be addressed in part by precipitating these elements out in a pre-treatment softening step. The issue may be further addressed by biologically reducing $SO_4$ and precipitating these contaminants as metal sulfides after removing nitrate and selenate and selenite. This precipitation may occur in a fixed film bioreactor which may be part of a single or multipart selenium reducing bioreactor.

The presence of selenium, as selenate or selenite, is a concern because of recent regulation of selenium concentrations in the effluent directly or indirectly, for example through fish tissue concentrations in the receiving body. The selenium is difficult to remove because of its low concentration and its tendency to form selenate or selenite and dissolve in water making physical or chemical removal difficult, costly or inefficient. Selenium is addressed in the process and apparatus by biologically reducing it to elemental selenium and then precipitating it for removal. This may be done in a fixed film bioreactor which may also be used to remove other contaminants.

FIG. 1 shows a treatment system 10 having a pretreatment area 12 upstream of a biological treatment area 14. Feed 16, which may be FGD blow-down water or another feed, flows into pretreatment area 12. In the pretreatment area 12, a large portion of the TSS in the feed is removed and Ca and Mg are removed to soften the feed 16. The pretreatment area 12 uses physical/chemical methods to treat the feed 16. For example, lime or sulfides or both may be added to the feed 16 to precipitate calcium, magnesium and metals. The precipitates may be removed by clarifiers, for example single stage or double stage clarifiers. Settling can be enhanced by the addition of coagulants or polymers.

Figure 6:
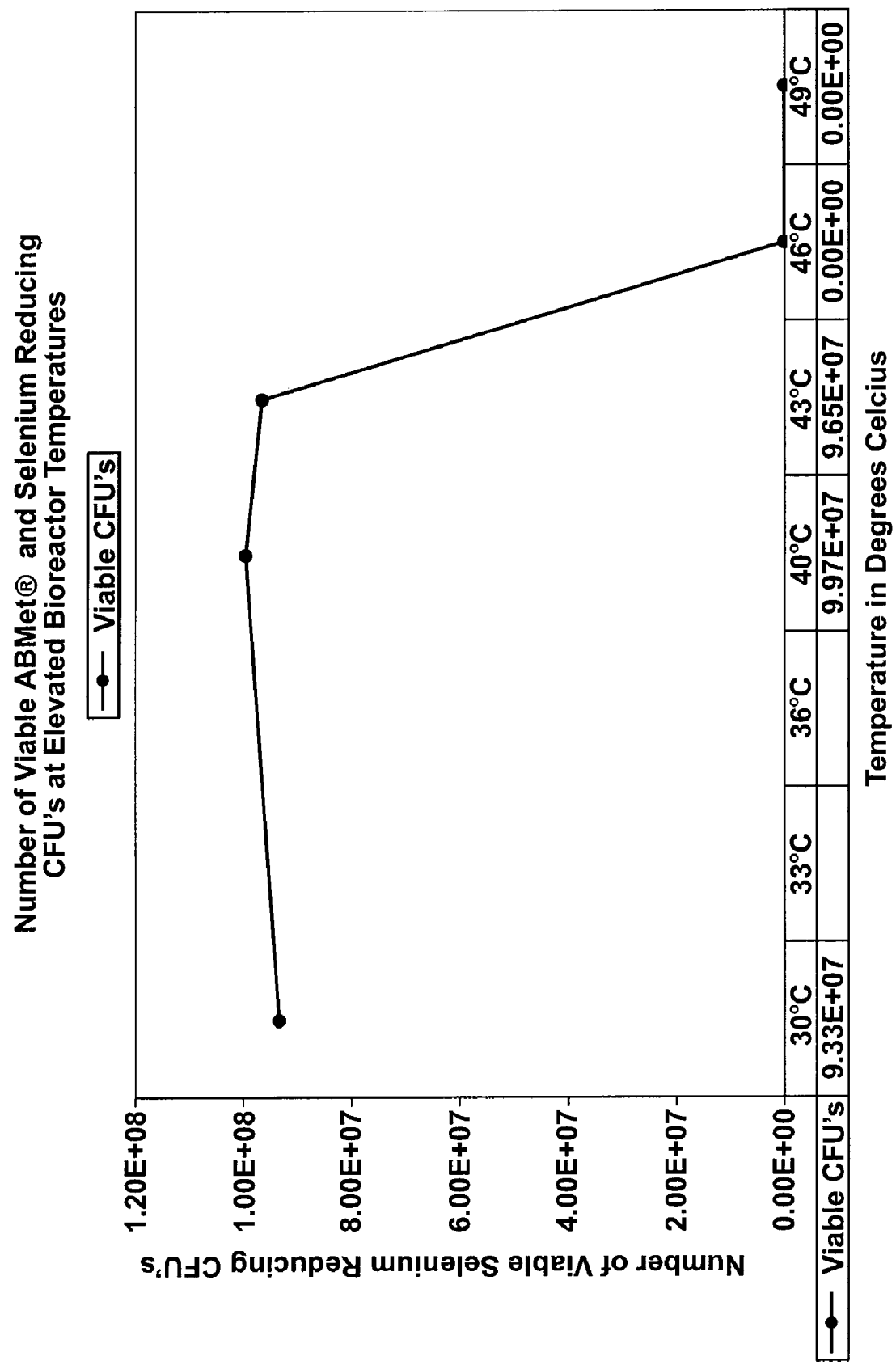
FIG. 6 is a chart of experimental results relating number of selenium reducing organisms to temperature.

Pre-treatment effluent leaves the pretreatment area 12 through a pretreatment effluent line 20. Dilution water 18 is added to the pretreatment effluent. The dilution water 18 reduces the total dissolved solids (TDS) concentration of the pretreatment effluent to make it acceptable for biological treatment downstream. Sufficient dilution water 18 may be added to make the TDS concentration like that of seawater, for example with a TDS of 35 g/L or less. Any low TDS water can be used for dilution water 18, for example cooling circuit blow down water from a power plant. The dilution water 18 also cools the FGD blow-down water, for example from 50° C. or more to about 43° C. or less or 40° C. or less, to further facilitate biological treatment. As shown in FIG. 6, the health of selenium reducing organisms declines above about 43° C. In general, a fixed film reactor may be operated at temperatures of about 40° F. to about 105° F. An established reactor may also tolerate higher temperature for short periods of time, for example a temperature to 110° F. for up to 24 hours.

The diluted pretreatment effluent then flows to the biological treatment area 14. The biological treatment area 14 has four zones: an aerobic zone 22; a first anoxic zone 24; a second anoxic zone 26; and, an anaerobic zone 28. These zones 22, 24, 26, 28 are shown connected in series in FIG. 1 although one or more of them may alternately be connected with recirculation loops. Further alternately, some of the zones 22, 24, 26, 28 may not be required in some embodiments. The zones 22, 24, 26, 28 may also occur in separate reactors or one or more zones 22, 24, 26, 28 may be combined into a single reactor. One or more of nutrient streams 30, 32, 34 may be used to add nutrients to any zone 24, 26, 28 downstream of a nutrient stream 30, 32, 34, either directly or through intervening zones 24, 26. For example, nutrients may be added in stream 30 or stream 32 to support the growth of bacteria in zones 26 or zone 28 or both.

The aerobic zone 22 is used to nitrify, assimilate or remove ammonia, to the extent that ammonia has not been stripped in the pretreatment area 12, and to oxidize organic carbon. An optional supplemental aerobic zone may also be added downstream of the anaerobic zone 28 to remove residual nutrients added before or in zones 24, 26, 28 and to oxidize residual compounds from anaerobic zone 28. If there is no TN discharge limit for the effluent, or if ammonia is stripped in the pretreatment area 12 such that TN in the effluent will be acceptable, the aerobic zone 22 may be omitted, or replaced by an aerobic zone downstream of the anaerobic zone 28.

In the first anoxic zone 24, nitrate acts as a preferred electron acceptor and is removed by denitrification. The nitrate may be removed to a concentration which facilitates the biological reduction of selenium in the second anoxic zone 26, considering that nitrate in high concentration will be used as an electron acceptor over low concentrations of selenate or selenite. For example, $NO_3$ may be reduced to 10 mg/L as N or less or 1 mg/L as N or less or 10 ppm as N or less in the stream leaving the first anoxic zone 24.

In the second anoxic zone 26, selenium is removed by biological reduction and removal, for example by precipitation into flush flow water or waste sludge. These steps may occur, for example, according to the process described in U.S. Pat. No. 6,183,644 or in other fixed or suspended bed reactors. The reactors may be seeded with selenium reducing organisms.

In the anaerobic zone 28, sulfate-reducing bacteria reduce sulfates and produce sulfides in the form of $H_2S$ or $HS^-$. Part of the $HS^-$ may react with soluble metals to form insoluble metal sulfides which may precipitate out of solution. In this way the anaerobic zone removes heavy metals. The off gas from the anaerobic step 28 can be recycled to the aerobic step 22 or to a downstream aerobic step to reduce the production of odors associated with $H_2S$.

In general, the zones 22, 24, 26, 28 may be arranged into one or more reactors. Each zone 22, 24, 26, 28 may occupy its own reactor, for example a CSTR optimized to reduce the primary target contaminant of each zone 22, 24, 26, 28. Alternately, for example, zones 22 and 24 can be combined into a combined nitrification/denitrification reactor which may have 1, 2 or more tanks. Zones 24, 26 and 28 or 26 and 28 may be combined into an ABMet or other fixed film reactor having one or more tanks. Other reactors may also be used. For suspended growth reactors, the limited concentrations of the target contaminants may be low and the presence of other contaminants may make biomass separation difficult and so membrane bioreactors are preferred. Alternately, fixed film reactors may be used, for example Moving Bed Bioreactors, for example as produced by Anox Kaldnes of Norway, fluidized bed reactors, for example as produced by Shaw Envirogen of New Jersey, USA, biofilters as produced by Degremont of France under the trade mark BIOFOR, granular activated carbon reactors, for example as produced by the Applied Biosciences Corp. of Utah, USA under the ABMet trade mark, or in membrane supported biofilm reactors (MSBR) as described in PCT Publication Nos. WO 2004/071973 or WO 2005/016826. Depending on the zone, the MSBR may operate autotrophically or heterotrophically optionally using a process of heterotrophic denitrification as described in Canadian Patent Application No. CA 2,477,333. Membrane separation may optionally be used with or after any fixed film reactor although there may also be no need for it. The entire disclosures of each of WO 2004/071973; WO 2005/016826 and CA 2,477,333 are incorporated herein by this reference to them.

Figure 2:
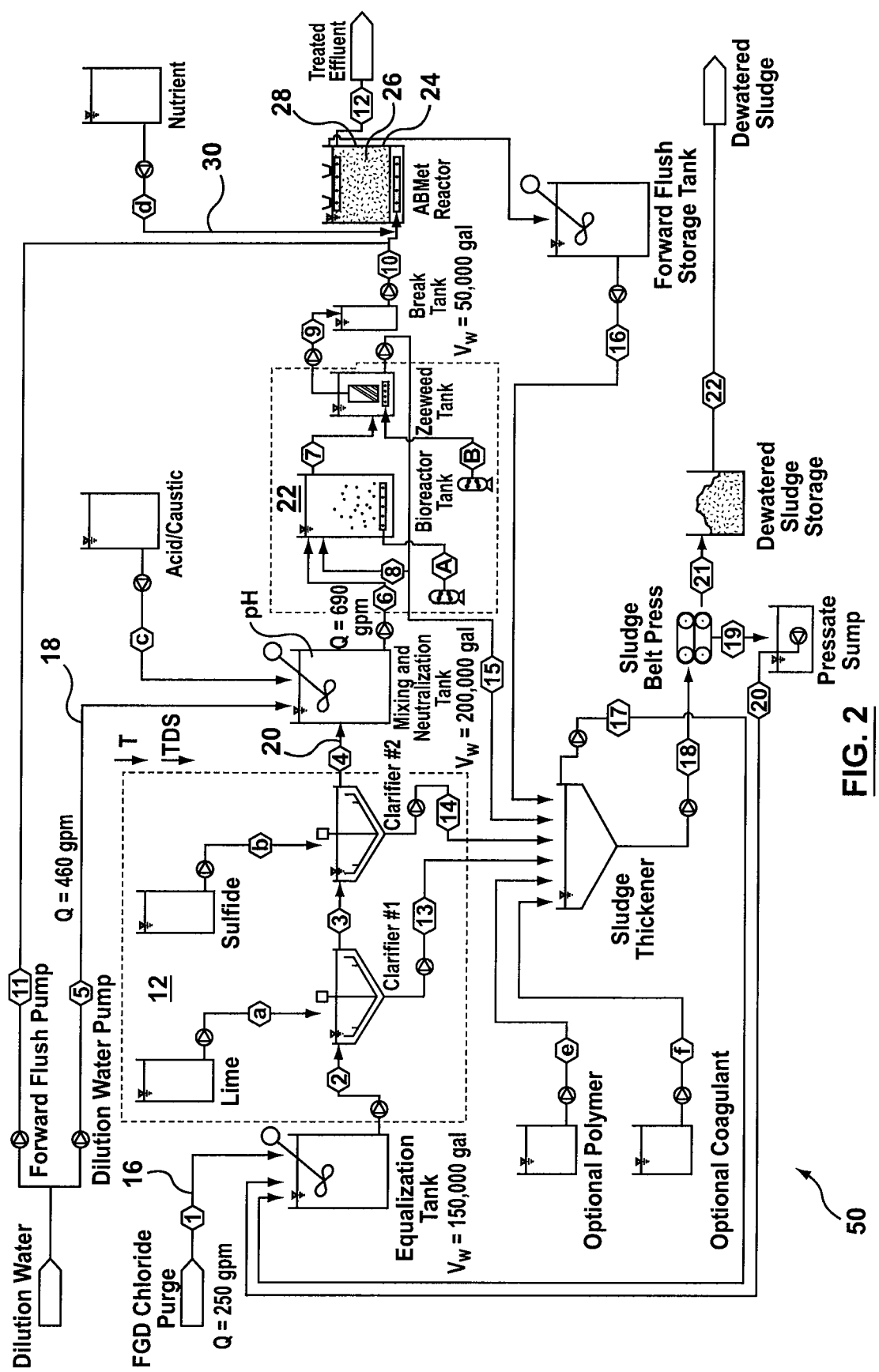
FIG. 2 is a schematic process flow diagram of another system for treating water.

FIG. 2 shows a process flow diagram of a treatment plant 50 used for, for example, treating FGD blow-down as described in Table 1. In the pretreatment area 12, pretreatment is by lime softening, optionally with sulfide addition, and 1 or 2 stage settling in clarifiers. Such a process may be provided by WesTech of Utah, USA or others. PH is adjusted in the pretreatment effluent 20 when the dilution water 18 is added to a pH of less than 8.5, for example between 6 and 8 to enhance biological treatment. In the aerobic zone 22, a membrane bioreactor having an aeration tank and a membrane tank containing ZeeWeed™ membranes from GE Water and Process Technologies, Zenon Membrane Solutions of Ontario, Canada, may be used for nitrification. The aerobic zone 22 may alternately be omitted. The first and second anoxic and anaerobic zones 24, 26, 28 may be provided in an ABMet® reactor system by Applied Bioscience Corp. of Utah, USA, or a similar or modified system which may consist of a 2 or more stage reactor configuration. This reactor is an up-flow fixed film reactor using a GAC bed operated in plug flow so that 3 biological zones corresponding to the first anoxic, second anoxic and anaerobic zones 24, 26, 28 can be established in sequence. A down flow reactor may alternately be used. A single nutrient stream 30 may be used upstream of the ABMet reactor. Alternately, if a two or more stage reactor is used, an inlet for nutrients may be provided upstream of one or more of, or each, stage although nutrients will not necessarily be provided from each inlet at all times. Precipitates are removed from this reactor by periodically flushing the GAC bed to overflow troughs. Sludge from the pretreatment area 12 and biological treatment area 14 is fed to a sludge thickener and dewaterer. Thickened and dewatered sludge is sent to waste. Sludge thickening and dewatering effluent is returned to an equalization tank to be mixed with the FGD blow down feed water 16. Further discussion of the use of an ABMet process or apparatus, or media filter generally, which may include modifications or enhancements to such a process or apparatus, are described below.

Figure 4:
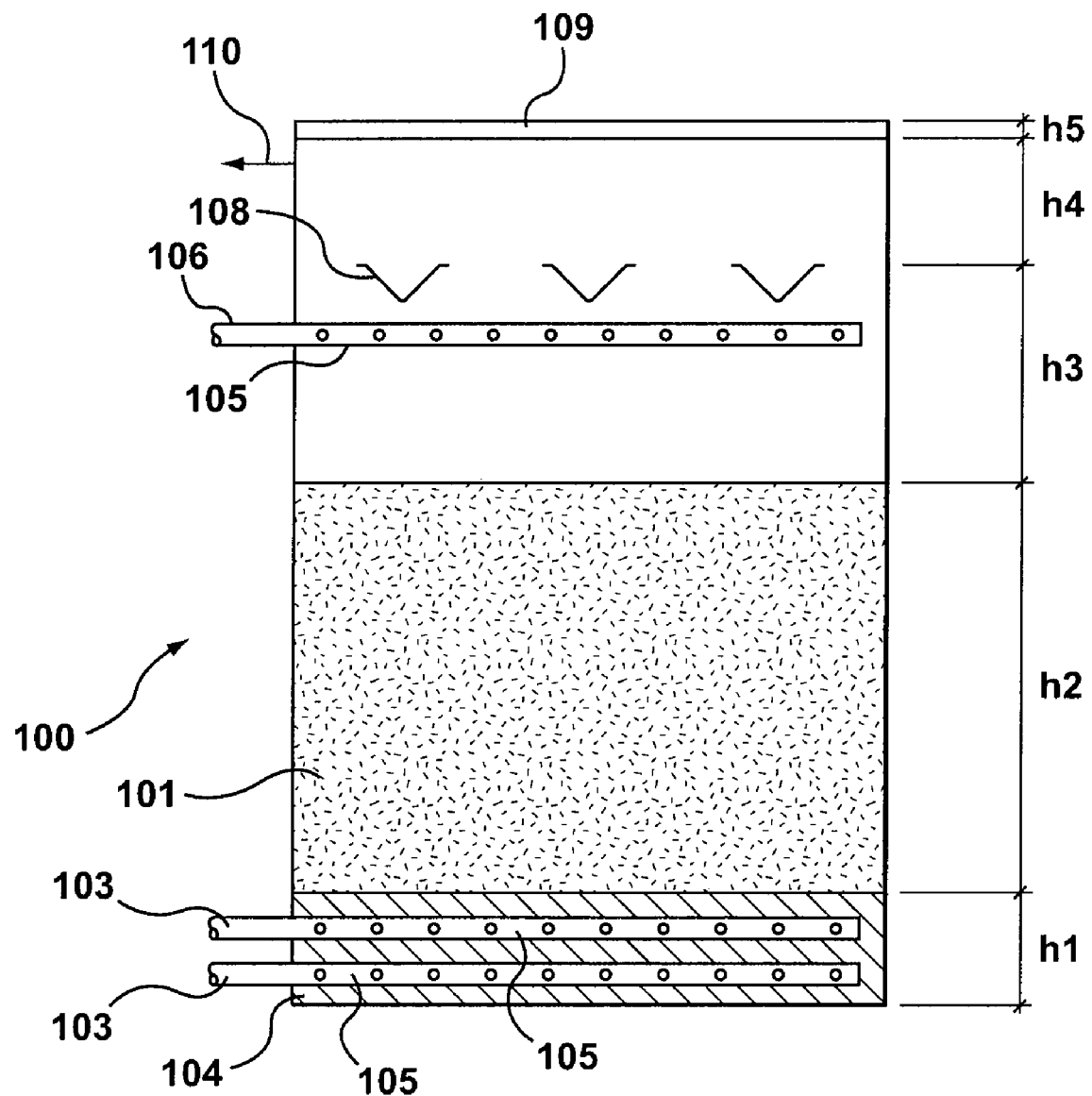
FIG. 4 is a cross section of a bioreactor.

An ABMet® reactor, may be described as an upflow or downflow, simple fixed growth or fluidized, activated carbon or other support media based, biological filter system or bioreactor. A sample reactor 100 is shown in cross section in FIG. 4. A media bed 101 is provided on which a population of selected microorganisms will grow and be retained within the system. Activated carbon may be employed as the medium and provides a very large surface area available for microbial growth. The activated carbon may be provided, for example, in the form of granular activated carbon or pelletized activated carbon. Other media might be used, for example polymeric fibers, crushed stone, pumice, sand, plastic media or gravel. With activated carbon, much of the surface area is protected in crevices within each carbon particle, thus sheltering biomass from shear and abrasive forces. The media bed 101 may occupy a zone h2 of the reactor 100.

The specific gravity of an activated carbon particle with attached biomass is slightly greater than 1.0. The particles may have a settling velocity in still water of about 160 ft/hr. The inventors have noticed that that settling rate is similar to that of granular sludge in upflow anaerobic sludge blanket (UASB) systems and so the influent distribution system and hydraulic regime within the carbon bed during normal forward flow conditions may be similar to UASB systems.

The reactor may have an upper port 106 and a lower port 102 and a backwash port 103, each of which may be connected to a distribution or collection system 105, for example one or more horizontal pipes. Optionally, for some systems, lower port 102 and backwash port 103 may be both connected to the same distribution or collection system 105 or be replaced by a single port and distribution or collection system 105. Uniform orifices may be located on the underside of these pipes at proper spacing intervals. Orifices may be designed at about a 1.0 psi pressure drop, which renders friction losses along each pipe insignificant and assures even flow distribution. Multiple pipes may be connected together through various headers or manifolds. One or more grades of aggregate 104 may be installed around and above the distribution or collection system or systems 105 in a subfill layer h1. The aggregate 104 will aid in flow distribution while also preventing break through of media to a distribution or collection system 105. System 105 connected to upper port 106 may be covered in a screen or have small holes to prevent media entry if required. Wastewater may enter the media bed 101 from the top or bottom. Wastewater may enter the reactor 100 through upper port 106, flow downwards through the media bed 101 and be withdrawn from lower port 102. Alternately, wastewater may enter through the bottom port 102, flow upwards through the media bed 101 and exit through the upper port 106. Upflow velocity under normal forward flow conditions may be maintained at about 5 ft/hr, well below the activated carbon settling rate of 160 ft/hr.

During the course of normal operation, solids will accumulate within the media bed 101. These solids may be of one or more of three types, 1) TSS which enters the reactor 100 and is retained, 2) biomass that is fixed to the media that grows and occupies additional space, and 3) inorganic contaminants that are biologically converted to solid forms and retained within a bed.

As solids accumulate, the pressure drop across the media bed 101 will increase. At a selected time interval or pressure point, the media bed may be flushed. This operation may be accomplished by utilizing backwash port 103 and its associated distribution or collection system 105. In this case, an upflow velocity of about 80 ft/hr of feed or water may be maintained to flush the media bed 101. Other velocities may be used, for example as in a range that would be used in activated carbon fluidized bed systems.

The upflow velocity applied during flushing may result in an upward expansion of the bed by up to 30% into a bed expansion layer h3. With this velocity, media particles may be fluidized, resulting in dislodging of trapped influent TSS, excessive biomass growth attached to the media and associated inorganic contaminants that have been removed from or precipitated out of the wastewater. The upflow velocity used is still comfortably below the settling rate of the media particles. Thus, unacceptable amounts of media will not be flushed, if any, from the bioreactors during this operation. The flushing water and entrained solids may be removed through troughs 108. Upper port 106 or lower port 102, whichever is used to withdraw treated effluent, may be closed during flushing.

A headspace layer h4 is provided above the expansion layer h3 and below a reactor cover 109 in layer h5. Gases released by the microorganisms may collect in the headspace layer h5. A vent or gas outlet 110 in the headspace h4 or cover h5 may be used to release these gases to the atmosphere or collect them for further treatment, for example in a downstream branch process or by recycle to an upstream part of the system.

From a hydraulic design standpoint, the reactor 100 may operate under conditions similar to UASB systems during upward feed flow periods, if any, and similar to biological fluidized beds during flushing. With proper function of upstream treatment steps, and given the low growth rate of the biomass within the media bed 101, flushing may be required from between once every two weeks to only a few times each year, for example once a month. Flushing may be a batch operation over a 30 minute period. Spent flush water may be returned to the head of the plant from where, for example, the solids will settle in solids contact clarifiers and ultimately be co-mingled with primary solids for dewatering and disposal. Alternately, flush water may be separately treated to separate out solids for separate post-treatment or disposal of the solids since the solids flushed from reactor 100 may contain selenium and heavy metals.

In addition to, or alternately in place of, flushing as described above, the reactor 100 may be "bumped", or briefly fluidized or backwashed, periodically or from time to time. Bumping may be done by flowing water, for example reactor 100 feed water, cooling water or tap water, or a mixture of gas, for example air, bubbles and water, through the backwash port 103 at a rate greater than the normal upwards flow feed rate. The bumping may be done at a velocity of between about 1 $gpm/ft^2$ to 14 $gpm/ft^2$ for a short period of time, for example 10 minutes or less or 5 minutes or less. The bumping may be done at a frequency between, for example, once per hour to once per week, for example between 1 and 4 times per day. The bumping expands the media bed 101, allows some solids to be removed from the system and also releases gas bubbles that accumulate in the media bed 101. Gas bubbles or solids in the media bed 101 can impede flow through the media bed 101. The primary purpose of bumping is thus to control head loss and provide a more even flow of water through the entire media bed 101 particularly by the release of gas bubbles from the media bed 101. The bump may raise the water level in the reactor to above troughs 108. Bump effluent water collected in troughs 108 can be handled as described for flush effluent. This provides for removal of TSS and may reduce or eliminate the need for more rigorous flushes as described above. Alternately, the effluent from some or all of the bumps may be recycled to the lower port 102. While this may place solids in an otherwise undesired part of reactor 100, the bump flows are small and the recycled solids may be removed in full flushes as described further above. Further, a portion of the solids in the bump effluent is biodegradable. Recycling these solids may allow for their biodegradation and so reduce the total amount of sludge that needs to be wasted from the system as a whole. The desired bumping frequency and duration is related to the removal of gases or solids and so is related to the suspended solids concentration or nitrogen level or both in the inlet to the reactor 100.

Figure 9:
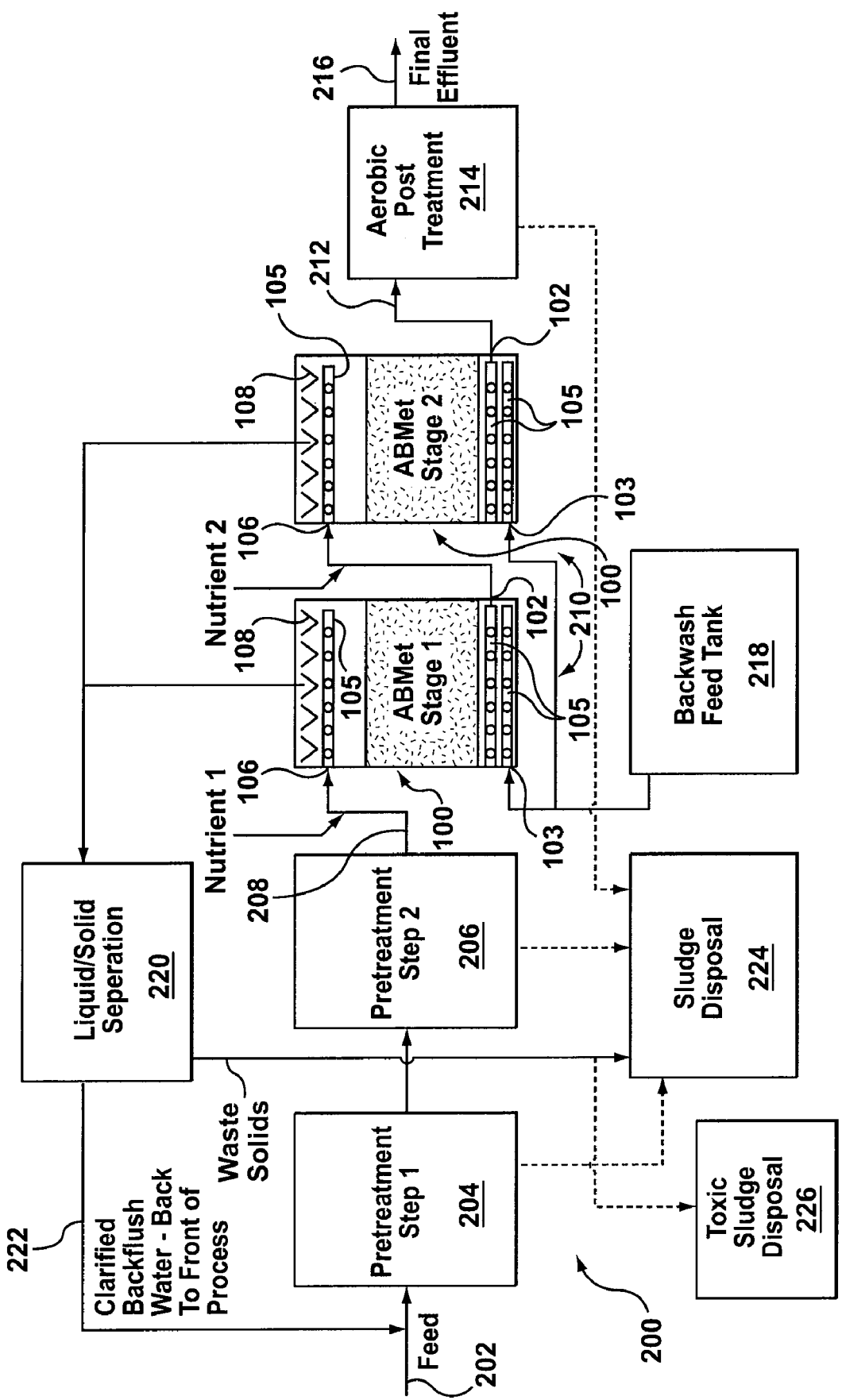
FIG. 9 is a schematic process flow diagram of another system for treating water.

Referring to FIG. 9, another system 200 is shown for treating a feed 202 which may be FGD blowdown water. Feed 202 is pretreated in a first pretreatment apparatus 204 and, optionally, a second pretreatment apparatus 206 or more pretreatment steps. These apparatus 204, 206 may be, for example, physical or chemical or physical and chemical treatment steps such as combined mixer and clarifier units used, for example, for lime or sulfide precipitation or any of the pretreatment steps described in this document. Pretreatment effluent 208 flows to a two stage bioreactor 210 having two of the reactors 100 of FIG. 4 operated in downflow configuration in series. Pretreatment effluent 206 flows to upper port 106 of the first reactor 100, then from lower port 102 of the first reactor 100 to the upper port 106 of the second reactor and out of the lower port 102 of the second reactor. Treated effluent 212 leaving the second reactor 100 may optionally flow to an aerobic post-treatment apparatus 214 to produce final effluent 216. Reactors 218 may be flushed or bumped by flowing backwash water from backwash feed tank 218 to the backwash port 103 of the reactor 100. Bump or flush water collected in troughs 108 may be treated in a backwash liquid/solid separation apparatus 220, such as a pond or clarifier. Clarified backwash water may be returned to the head of the plant. All sludge may be sent to a common sludge disposal system 224 or the backwash water sludge may be sent to a separate toxic sludge disposal system 226. Nutrients may be added to the pretreatment effluent 208, the pipe between the lower port 102 of the first reactor 100 and the upper port 106 of the second reactor 100 or both.

The microorganisms that will perform the various functions discussed above will require a food or carbon source. A molasses-based nutrient mixture may be used. The nutrient may be chosen to provide a carbon:nitrogen:phosphorous ratio (CNP) of, for example, 100:10:1, when mixed with the feed. For example, the feed may already contain sufficient phosphorous and so there may be no need for phosphorous in the nutrient solution. Nutrient may be supplied, for example, at a rate of 0.2-0.4 gallons of nutrient per 1000 gallons of feed water. This basic mixture may be supplemented with micronutrients and other components shown to promote stable growth for the target microbial population. The nutrient can be added to the lead bioreactor and/or to the second or later cell in a two or more stage reactor.

Figure 7:
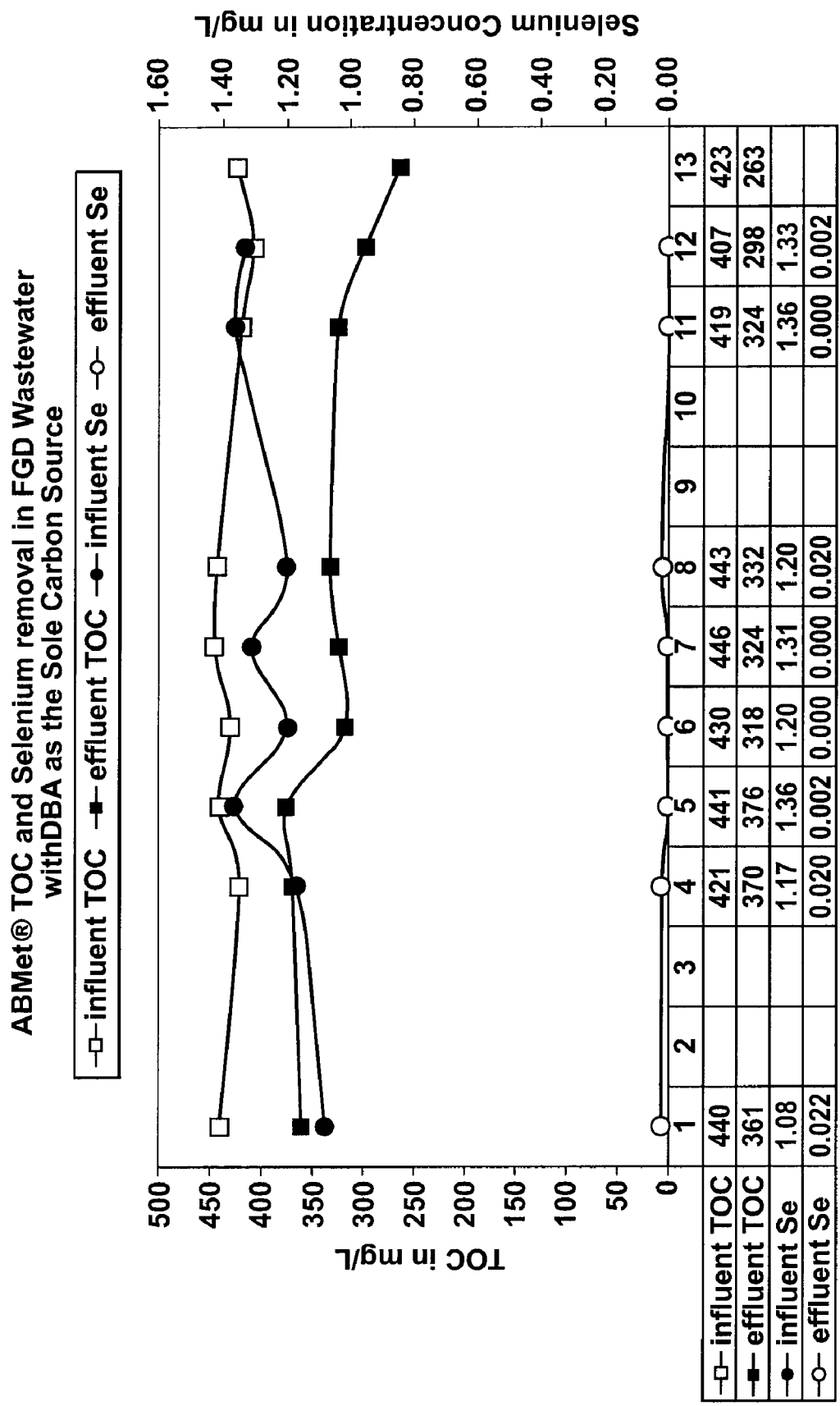
FIG. 7 is a chart of selenium reduction in FGD blow down water using DBA as a carbon source.

DBA, if used in the FGD system to enhance sulfur removal, will leave a concentration of DBA in the wastewater. Some or all of the DBA will remain in the wastewater after physical or chemical pretreatments and even to some extent after an aerobic biological treatment step, if there is any. DBA is carbon-based and may be used by the microbes as a nutrient. As shown in FIG. 7, DBA in sufficient quantities can be used as the sole carbon source for selenium reducing microorganisms. DBA present in lesser amounts may be accounted for in reducing the nutrient carbon amount or feed rate. An excess of DBA, if inhibiting the growth of desired organisms compared to undesired organisms or interfering with ORP gradient control, can be reduced by oxidation upstream of the reactor 100. In general, the extent to which DBA may be utilized in the anoxic or anaerobic sections of the beds can be managed by redox or nutrient control or upstream processes.

When reactor 100 is used to provide first and second anoxic zones 24, 26 and anaerobic zone 28, there are three primary, biochemical reactions, which may occur within the biomatrix.

Remaining nitrates are reduced to nitrogen gas, which will be subsequently released to the atmosphere.

Selenium is reduced from an oxidized state to elemental form. Elemental selenium will form so-called "nanospheres" that will attach to the cell walls of the microbes performing the reductive function. As the microbes are attached to the media, selenium will be likewise retained within the media bed until flushing.

Sulfates present are reduced to hydrogen sulfide. Further, the sulfides generated in the biomatrix complex as metal sulfide precipitates that are retained. Sulfides are effective at complexing with zinc, copper, nickel, lead and a host of other primary metals. While required metals removal may be accomplished in the primary treatment steps, the reactor 100 may provide further treatment and polishing for metals removal.

A bioreactor configuration may involve multiple trains of two or more reactors 100 in series or other configurations. A generally plug flow regime may be maintained as wastewater flows through each train of two or more successive reactors 100. This arrangement may facilitate control of redox potential ranges associated with each of the three biochemical reactions discussed above or others. A single bioreactor 100 can also be used and similarly controlled.

Figure 8:
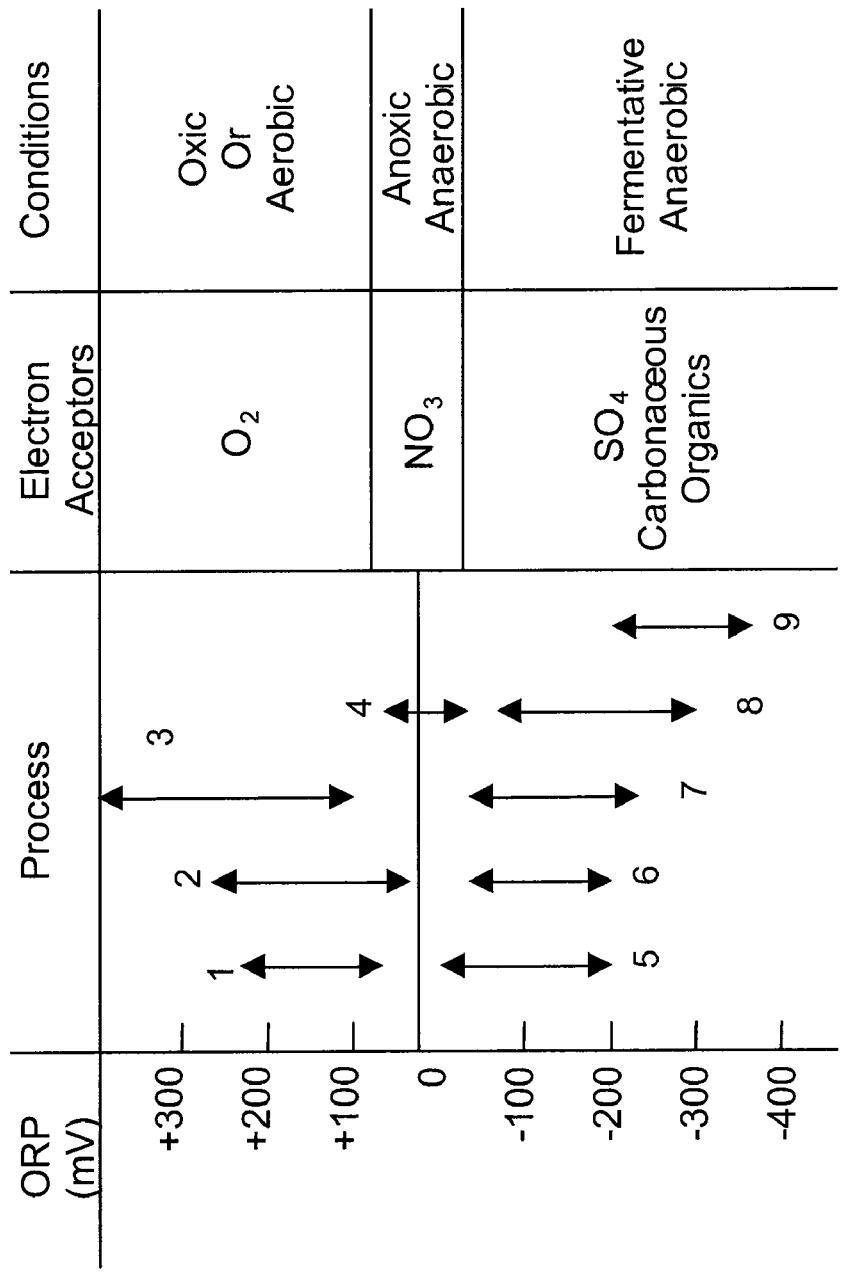
FIG. 8 is a chart showing ranges of ORP for various reactions.

Each of the reactions discussed above occur primarily in different, although possibly overlapping, redox ranges as shown in FIG. 8. Wastewater entering the lead reactor 100 in each train will have a positive or slightly negative redox level. As the flow progresses through the bed, the redox level will gradually decrease. As the redox level drops into negative territory, remaining nitrates will be reduced first. As can be seen from FIG. 8, nitrates will be reduced at levels down to −150 mV.

Selenium will then be reduced as the redox proceeds downward to −200 mV. Lastly, sulfate reduction to sulfide will occur down to −300 mV. Although the ORP range for sulfate reduction and selenium reduction largely overlap, selenium reduction may occur first and in preference over sulfate reduction and so sulfate reduction may not reach high levels or be complete until after selenium reduction is nearly complete.

With a generally plug flow regime, a redox gradient is developed through the bed or beds. This gradient can be controlled by adjusting the rate of nutrient addition or hydraulic retention time (HRT) or both in the bed or beds. In general, HRT may be altered at the design stage by choosing the bed dimensions in relation to the feed either by changing the dimensions of the bed or the number of beds in series or parallel. HRT in one or more beds in series may be, for example, in the range from 2 hours to 12 hours. After a system is built, changes to feed flow rate to the reactor 100 will alter HRT. However, nutrient addition may be easier to vary after a system is built and operating. Higher levels of nutrient addition will drive redox lower; reducing nutrient addition will cause redox level to rise. Optional inter-stage nutrient addition between reactors 100 in series may provide additional flexibility in redox control. ORP sensors may be provided at the outlet of each of the two reactors 100 in a two stage system. An ORP sensor may also be provided in the feed to a reactor 100. ORP sensors may also be provided at intermediate points in one or more stages of a reactor. An operator or automated system may record the ORP values at a sampling interval and maintain a record of the values. The values may be used to determine an input parameter to a controller or decision table. For example, the ORP values in the outlet of each of the two stages of a two stage reactor may be recorded at a sampling rate, which may vary from, for example, 1 to 24 times per day. A running average of the values over an averaging period, for example 0.5 to 2 days is calculated. The running averages are used and considered in determining, manually or automatically, how the supply of nutrients upstage of either or both of the stages should be altered to produce a more desired redox level.

By being able to control redox level, the system can be tuned to optimize removal of certain contaminants. Specifically, nutrient addition can be controlled to maintain optimal redox for selenium reduction (−50 to −200 mV) in at least a zone of the reactor. For example, nutrient addition upstream of a first reactor 100 in a two stage system may be calculated to produce an ORP of −50 to −200 mV at the outlet of the first reactor. Nutrient addition upstream of a second reactor 100 may be controlled to provide an ORP of −200 to −350 mV in the outlet of the second reactor 100 to enhance sulfide production in the second reactor 100. As an alternate example, in an application where metals removed in the reactor is less important, nutrient addition may be controlled to provide an ORP of −50 mV or less, for example −50 mV to −100 mV, at the outlet of the first reactor 100 and −200 mV or more, for example, −150 mV to −200 mV at the outlet of the second reactor 100 of a two stage system.

The generally plug flow regime allows specific populations to reside in somewhat dedicated zones within the carbon beds and so each zone may contain multiple types of organisms although the redox levels for various functions may overlap. Nonetheless, removal can be achieved for a range of contaminants.

Figure 5:
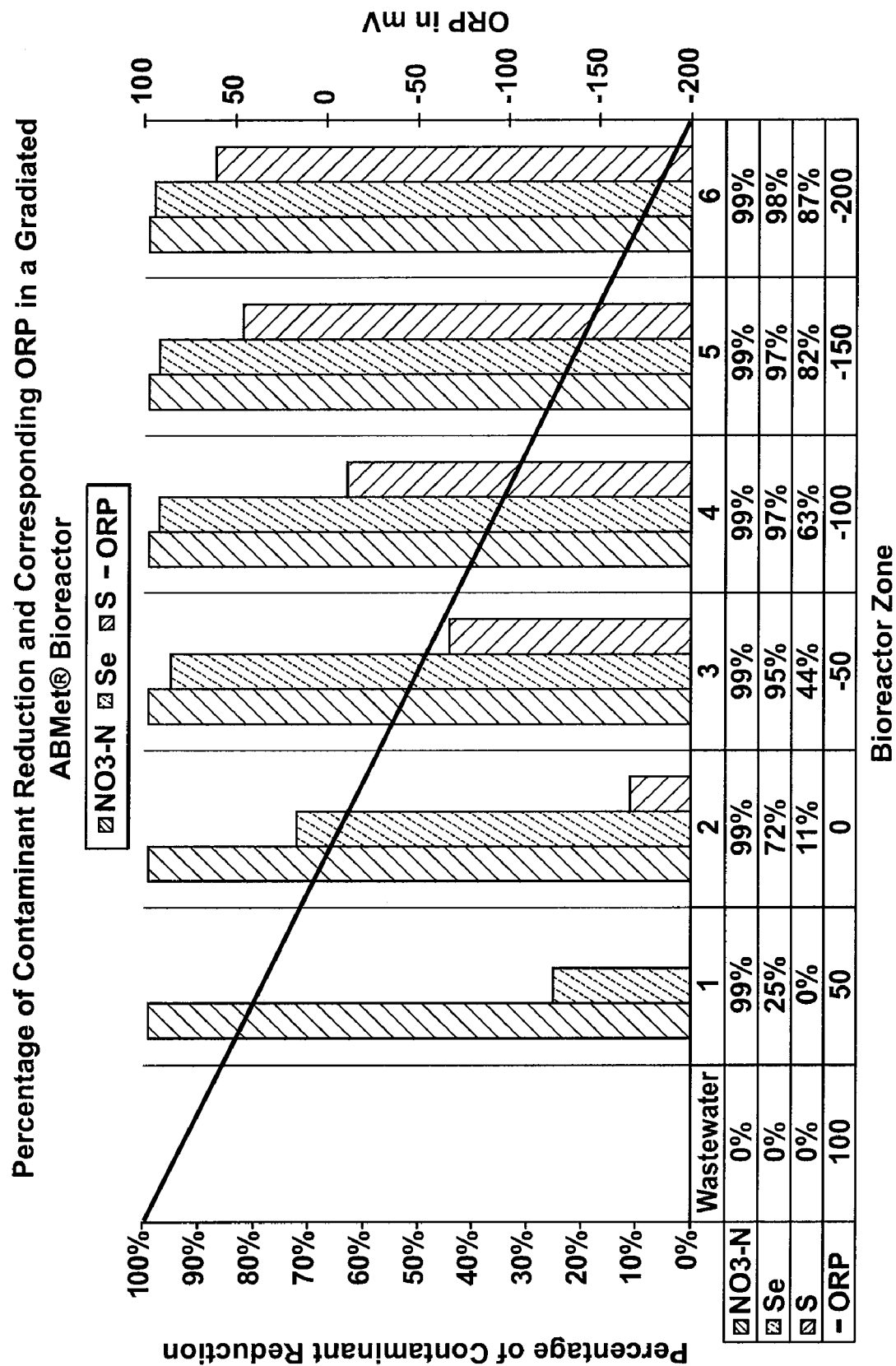
FIG. 5 is a chart of experimental results using a multi-stage bioreactor.

The influence of ORP gradient on contaminant removal is demonstrated in FIG. 5. Water entering a reactor 100 contains dissolved oxygen, and oxidized species of contaminants (i.e., nitrate, selenate, selenite), and has a positive ORP of +100 in this example. Samples were collected at various points across a multi-stage bioreactor and measured for ORP, selenium, sulfate, and nitrate-N. Contaminants were removed in their respective stages along this ORP gradient that had been established in the bioreactor bed.

ORP can be controlled through the system by inter-stage nutrient delivery, and by controlling the HRT of each stage, which is done by increasing or decreasing the influent flow rate. The ORP can be controlled within the range of +150 mV to −400 mV.

In the example of FIG. 5, a reactor was divided into six stages. Nitrate-N is removed in the first stage, with only 25% of the selenium being reduced. None of the sulfate is reduced. Removal in later stages is as shown in the Figure. Through controlling the ORP gradient, a system can be configured to remove for, for example, only Nitrate-N removal, Nitrate-N removal with selenium removal, and/or multiple contaminant removal via direct reduction and sulfide precipitation.

Denitrification may be carried out concurrent with or before sulfate and selenium reduction. As the biomass carrying out these reactions are fixed to the support media (which will be retained within the system), the evolution of nitrogen gas will not materially impact biomass retention. Gases created in a reactor may be removed by bumping as described above as required.

The biomass that will grow in the bioreactor cells may occur naturally in our environment. Sulfate reducers and denitrifiers may grow naturally with little encouragement required. Given that required metals removal may be accomplished in the primary treatment steps, control of redox levels may optionally be such that sulfate reduction (and sulfide formation) is minimized.

Microbes that have demonstrated the ability to reduce oxidized selenium to elemental form have been isolated from various locations in the western U.S.A., for example by Applied Biosciences Corp. of Utah U.S.A. Several species of these microorganisms may be isolated and grown. At plant start-up, an innoculum charge of these microbes may be supplied to seed the bed. For example, the bioreactor 100 may be seeded with an initial charge of microbes. The initial charge may contain a mixture of 2-6 strains of microbes of the genus *Pseudomonas, Shewanella, Alcaligenes* or other environmental microbes, which have been selected based on, or in anticipation of, their growth and contaminant reduction in the water of interest. A population large enough to seed the reactor 100 may be grown on site from a supply of centrifuged and freeze dried starter microbes prepared remotely. These microbes quickly attach to activated carbon or other media, and proliferate thereafter in the presence of nutrient material. Following innoculum loading, the bioreactor cells may be operated in a recycle mode for several days to allow the microbes to attach. An alternate seeding procedure is to first soak the bed in a nutrient solution. After this pretreatment, approximately one reactor value of a mixture of seed microorganisms in water, optionally containing some nutrient solution, is placed in the reactor. The reactor is then allowed to sit for a period of time, for example 1 to 3 days, to allow the microorganisms to attach to the media before starting feed flow through the reactor. Thereafter, normal feed flow can be introduced and plant commissioning may proceed.

Following the completion of commissioning, a periodic bioassay evaluation may be conducted. This evaluation may involve collection of carbon samples at various depths in each bioreactor cell. Each sample may be measured for redox level and the microbes examined to develop a biological community profile. This study may generate an information baseline to ensure that the proper microbial mix is maintained within the system over time and may be considered, for example in combination with on-line ORP measurements or to adjust target ORP ranges, in controlling nutrient addition.

Two or more bioassay evaluations may be conducted following commissioning of a plant. In the event that a bioassay evaluation shows that the specific microbes needed for selenium reduction are not present in appropriate numbers, a supplemental inoculum charge may be provided. Additional bioassay evaluations may be performed from time to time to monitor the performance of the reactor and the results may be considered in modifying desired ORP ranges at one or more points in the reactor. A reactor as discussed above may be used to provide one or more of the first and second anoxic and anaerobic zones 24, 26, 28.

Figure 3:
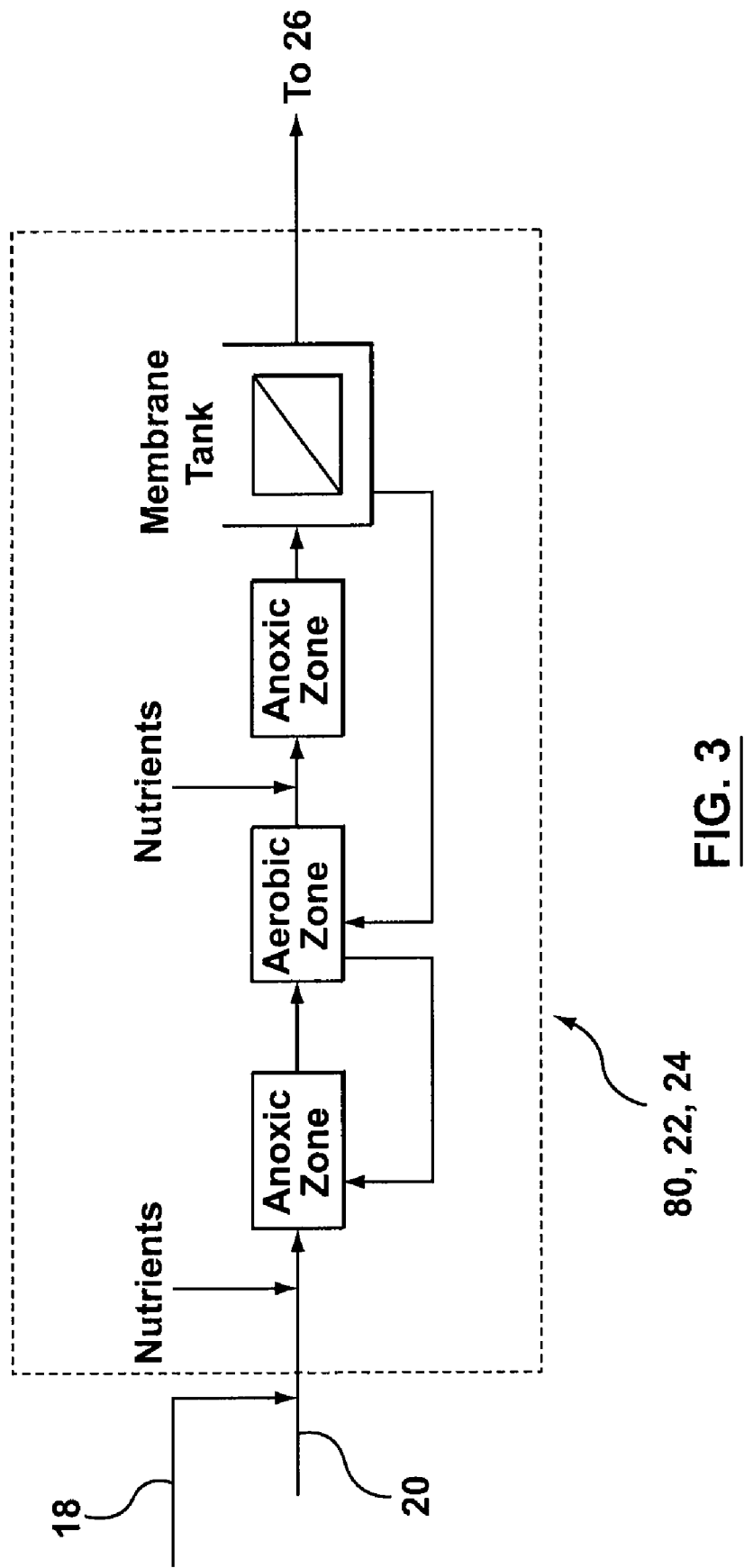
FIG. 3 is a schematic diagram showing an alternate embodiment for part of the system and process of FIG. 1 or 2.

FIG. 3 shows a nitrification/denitrifiation reactor 80 used to provide the aerobic and first anoxic zones 22, 24 of FIG. 1. Nitrificatiopn/denitrification reactor 80 may also be used to replace the bioreactor tank and ZeeWeed tank of FIG. 2 to provide the aerobic and first anoxic zones 22, 24 and allow the ABMet reactor to be operated with the second anoxic and anaerobic zones 26, 28 with a minimal or no first anoxic zone 24.

We claim:

1. A process for treating water comprising flue gas desulphurization blowdown water to remove selenium from the water comprising the steps of,
    a) treating the water to reduce its total suspended solids concentration;
    b) flowing the water through a first media bed reactor and then through a second media bed reactor;
    c) adding one or more nutrients to the water flowing through the first media bed reactor in an amount such that the oxygen reduction potential of the water at an outlet of the first media bed reactor is between −50 mV and −200 mV; and,
    d) adding one or more nutrients, in addition to the one or more nutrients of step c), to the water flowing through the second media bed reactor such that the oxygen reduction potential of the water at an outlet of the second media bed reactor is between −150 mV and −350 mV.

2. The process of claim 1 comprising a step of periodically bumping one or more of the first media bed reactor and the second media bed reactor at least one per week to release solids.

3. The process of claim 1 wherein the one or more nutrients comprise molasses.

4. The process of claim 1 wherein the one or more nutrients added in step c) comprise dibasic acid (DBA) that was added to the water to during a flue gas desulphurization process.

* * * * *

UNITED STATES PATENT AND TRADEMARK OFFICE
CERTIFICATE OF CORRECTION

| | |
|---|---|
| PATENT NO. | : 8,163,181 B2 |
| APPLICATION NO. | : 12/856030 |
| DATED | : April 24, 2012 |
| INVENTOR(S) | : Peeters et al. |

It is certified that error appears in the above-identified patent and that said Letters Patent is hereby corrected as shown below:

On the Face Page, in Field (56), under "OTHER PUBLICATIONS", in Column 2, Line 2, delete "Seleniam" and insert -- Selenium from Mining Effluent --, therefor.

On Page 2, in Field (56), under "OTHER PUBLICATIONS", in Column 2, Line 1, delete "Twiowell" and insert -- Twidwell --, therefor.

On Page 2, in Field (56), under "OTHER PUBLICATIONS", in Column 2, Line 6, delete ""Seienate" and insert -- "Selenate --, therefor.

On Page 2, in Field (56), under "OTHER PUBLICATIONS", in Column 2, Line 7, delete "Biogenchemical" and insert -- Biogeochemical --, therefor.

On Page 2, in Field (56), under "OTHER PUBLICATIONS", in Column 2, Line 12, delete "Sity" and insert -- Situ --, therefor.

In Column 5, Line 67, delete "selanate" and insert -- selenate --, therefor.

In Column 13, Line 42, delete "innoculum" and insert -- inoculum --, therefor.

In Column 13, Line 54, delete "innoculum" and insert -- inoculum --, therefor.

In Column 14, Line 25, delete "denitrifiation" and insert -- denitrification --, therefor.

In Column 14, Line 27, delete "Nitrificatiopn" and insert -- Nitrification --, therefor.

In Column 14, Line 36, in Claim 1, delete "of," and insert -- of: --, therefor.

In Column 14, Line 59, in Claim 4, delete "water to during" and insert -- water during --, therefor.

Signed and Sealed this
Fourth Day of September, 2012

David J. Kappos
*Director of the United States Patent and Trademark Office*